(12) United States Patent
Hsu et al.

(10) Patent No.: US 10,774,998 B2
(45) Date of Patent: Sep. 15, 2020

(54) WAVELENGTH-CONVERTING WHEEL AND PROJECTION APPARATUS

(71) Applicant: Coretronic Corporation, Hsin-Chu (TW)

(72) Inventors: Pi-Tsung Hsu, Hsin-Chu (TW); Chi-Tang Hsieh, Hsin-Chu (TW); Ming-Tsung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/274,254

(22) Filed: Feb. 13, 2019

(65) Prior Publication Data

US 2019/0249833 A1 Aug. 15, 2019

(30) Foreign Application Priority Data

Feb. 14, 2018 (CN) ..................... 2018 2 0258394 U

(51) Int. Cl.
*G03B 21/20* (2006.01)
*F21K 9/64* (2016.01)
(Continued)

(52) U.S. Cl.
CPC .............. *F21K 9/64* (2016.08); *F21S 10/007* (2013.01); *F21V 9/40* (2018.02); *G02B 26/008* (2013.01);
(Continued)

(58) Field of Classification Search
CPC .... G03B 21/28; G03B 21/204; G03B 21/208; G03B 21/2013; G03B 21/2033;
(Continued)

(56) References Cited

U.S. PATENT DOCUMENTS

2015/0036106 A1* 2/2015 Nagahara ............. H04N 9/3161
353/31
2015/0226389 A1* 8/2015 Kasugai ............... G02B 26/008
353/31

(Continued)

FOREIGN PATENT DOCUMENTS

CN 103792635 B 2/2016
CN 103912849 B 6/2016
(Continued)

*Primary Examiner* — Sultan Chowdhury

(57) ABSTRACT

A wavelength-converting wheel has a light incident side. The wavelength-converting wheel includes a motor, a turntable, a wavelength-converting layer and a reflective element. The motor has a rotating shaft. The turntable has an inner ring portion and an annular irradiation portion. The inner ring portion is sleeved on the rotating shaft, the annular irradiation portion is connected to an outer edge of the inner ring portion, and the annular irradiation portion includes a light-reflecting region and a wavelength-converting region. The wavelength-converting layer is disposed in the wavelength-converting region and has a light receiving surface facing the light incident side. The reflective element is disposed in the light-reflecting region and has a reflective surface facing the light incident side. The light receiving surface is coplanar with the reflective surface or the light receiving surface is farther from the light incident side with respect to the reflective surface.

18 Claims, 9 Drawing Sheets

(51) Int. Cl.
  *F21V 9/40* (2018.01)
  *G02B 26/00* (2006.01)
  *F21S 10/00* (2006.01)
  *F21Y 115/10* (2016.01)

(52) U.S. Cl.
  CPC ....... *G03B 21/204* (2013.01); *G03B 21/2066* (2013.01); *F21Y 2115/10* (2016.08)

(58) Field of Classification Search
  CPC ......... G03B 21/2066; F21K 9/60; F21K 9/62; F21K 9/64; F21K 9/65; F21K 9/68
  See application file for complete search history.

(56) References Cited

U.S. PATENT DOCUMENTS

| | | | |
|---|---|---|---|
| 2015/0263486 A1* | 9/2015 | Terasaki | G03B 21/145 353/30 |
| 2016/0041457 A1* | 2/2016 | Oh | G03B 21/204 353/31 |
| 2017/0289511 A1* | 10/2017 | Usami | H04N 9/3194 |
| 2017/0293211 A1* | 10/2017 | Kobayashi | G03B 21/00 |
| 2017/0328540 A1* | 11/2017 | Paul | F21K 9/64 |

FOREIGN PATENT DOCUMENTS

| | | |
|---|---|---|
| CN | 103912848 B | 7/2016 |
| TW | I579634 B | 4/2017 |

* cited by examiner

WAVELENGTH-CONVERTING WHEEL AND PROJECTION APPARATUS

CROSS-REFERENCE TO RELATED APPLICATION

THIS APPLICATION CLAIMS THE PRIORITY BENEFIT OF CHINA APPLICATION (CN201820258394.4 FILED ON 2018 Feb. 14). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display apparatus, and more particularly to a wavelength-converting wheel and a projection apparatus using the wavelength-converting wheel.

BACKGROUND OF THE INVENTION

With the market demand for projection apparatus's brightness, color saturation, service life, non-toxic environmental protection and so on, the types of light sources used by projection apparatuses have evolved from ultra-high pressure mercury lamps (UHP lamps), light emitting diodes (LEDs), to laser diode (LD) light sources.

Currently, the cost of high-brightness red laser diodes and green laser diodes is too high. In order to reduce costs, blue laser diodes are generally used to excite phosphors on phosphor wheels to generate yellow light and green light. The desired red light is filtered through a filter wheel, and blue light emitted by a blue laser diode is combined to form the three primary colors of red, green and blue required for the projection image.

The phosphor wheel is an important element in a projection apparatus using a laser diode as a light source. It is responsible for converting the blue light emitted from the blue laser diode into yellow light and green light, or reflecting or allowing the blue light to pass therethrough. In a conventional phosphor wheel capable of reflecting blue light, a phosphor layer is provided on the turntable of the phosphor wheel, and the turntable has openings for disposing reflective glass. Since the reflective surface of the reflective glass and the surface of the turntable on which the phosphor layer is disposed are generally in the same plane, the surface of the phosphor layer is higher than the reflective surface of the reflective glass. In some optical designs and applications, the incident blue light cannot be focused on the phosphor layer, resulting in poor wavelength conversion efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength-converting wheel, which can improve the wavelength conversion efficiency.

The invention provides a projection apparatus, and the wavelength-converting wheel thereof can improve the wavelength conversion efficiency.

Other objectives and advantages of the invention can be further understood from the technical features disclosed by the invention.

In order to achieve one or partial or all of the above or other objectives, an embodiment of the invention provides a wavelength-converting wheel having a light incident side. The wavelength-converting wheel includes a motor, a turntable, a wavelength-converting layer and a reflective element. The motor has a rotating shaft. The turntable has an inner ring portion and an annular irradiation portion. The inner ring portion is sleeved on the rotating shaft, the annular irradiation portion is connected to an outer edge of the inner ring portion, and the annular irradiation portion includes a light-reflecting region and a wavelength-converting region. The wavelength-converting layer is disposed in the wavelength-converting region and has a light receiving surface facing the light incident side. The reflective element is disposed in the light-reflecting region and has a reflective surface facing the light incident side. The light receiving surface is coplanar with the reflective surface or the light receiving surface is farther from the light incident side with respect to the reflective surface.

In order to achieve one or partial or all of the above or other objectives, an embodiment of the invention provides a projection apparatus, which includes an illumination system, a light valve and a projection lens. The illumination system is adapted to provide an illumination beam. The light valve is disposed on a transmission path of the illumination beam to convert the illumination beam into an image beam. The projection lens is disposed on a transmission path of the image beam. The illumination system includes an exciting light source and the above wavelength-converting wheel. The exciting light source is adapted to provide an exciting beam. The wavelength-converting wheel is disposed on a transmission path of the exciting beam. The wavelength-converting layer of the wavelength-converting wheel is adapted to convert the exciting beam into a converted beam. The reflective element of the wavelength-converting wheel is adapted to reflect the exciting beam. The illumination beam includes the converted beam and the exciting beam reflected by the reflective element.

In summary, in the projection apparatus and the wavelength-converting wheel of the embodiment of the invention, the light receiving surface of the wavelength-converting layer facing the light incident side is coplanar with the reflective surface of the reflective element facing the light incident side or the light receiving surface is farther from the light incident side with respect to the reflective surface. As such, the incident exciting beam can be relatively accurately focused on the light receiving surface and the reflective surface, so that the wavelength conversion efficiency of the wavelength-converting wheel can be improved and the reflection efficiency of the reflective element can be also taken into consideration.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
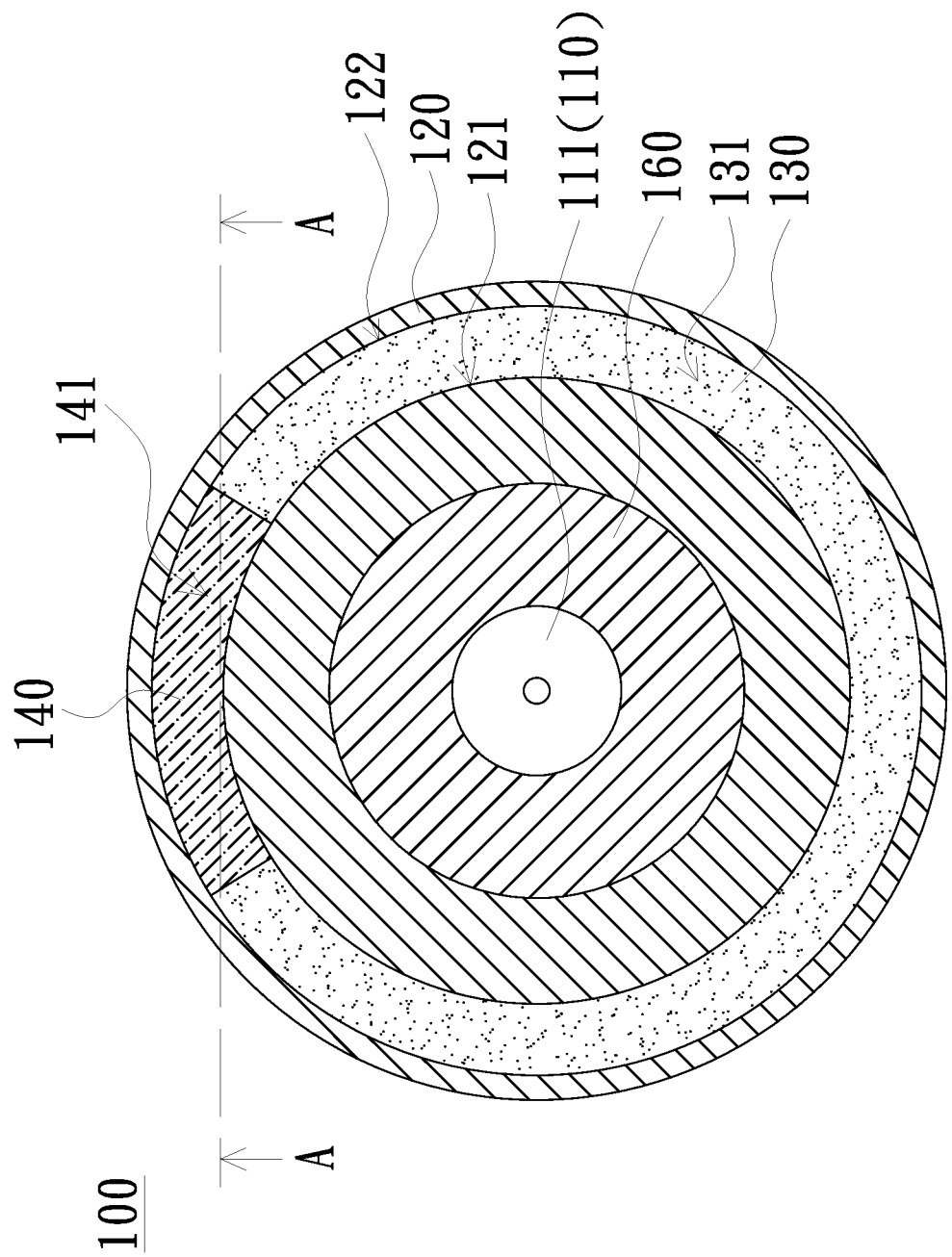
FIG. 1 is a schematic view of a wavelength-converting wheel according to an embodiment of the invention.
Figure 2:
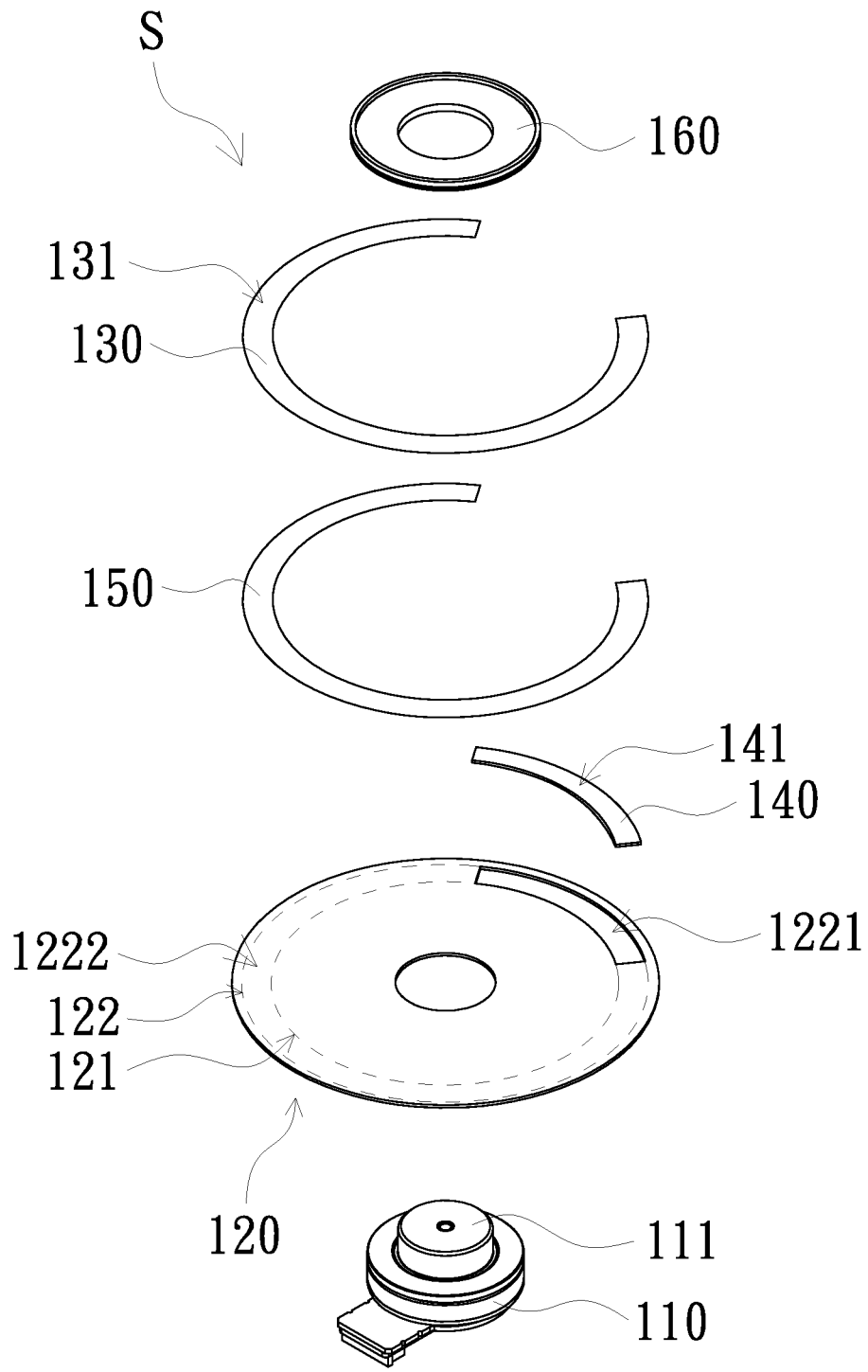
FIG. 2 is an exploded view of FIG. 1.

FIG. 1 is a schematic view of a wavelength-converting wheel according to an embodiment of the invention. FIG. 2 is an exploded view of FIG. 1. Referring to FIGS. 1 and 2, the wavelength-converting wheel 100 of the embodiment has a light incident side S and includes a motor 110, a turntable 120, a wavelength-converting layer 130 and a reflective element 140. The motor 110 has a rotating shaft 111. The material of the turntable 120 is, for example, metal, but the invention is not limited thereto. The turntable 120 has an inner ring portion 121 and an annular irradiation portion 122. The inner ring portion 121 is sleeved on the rotating shaft 111, and the annular irradiation portion 122 is connected to the outer edge of the inner ring portion 121. The annular irradiation portion 122 refers to a preset region that can be irradiated with the exciting beam as the turntable 120 rotates. The annular irradiation portion 122 includes a light-reflecting region 1221 and a wavelength-converting region 1222. The wavelength-converting layer 130 is disposed in the wavelength-converting region 1222 of the annular irradiation portion 122 and has a light receiving surface 131 facing the light incident side S. The material of the wavelength-converting layer 130 may be phosphor materials such as fluorescent materials, phosphors, or nano materials such as quantum, but the invention is not limited thereto. The wavelength-converting layer 130 may also include a plurality of blocks, each of which is disposed with a wavelength-converting material that can be excited to emit beams of different colors. The reflective element 140 is disposed in the light-reflecting region 1221 and has a reflective surface 141 facing the light incident side S. In addition, the wavelength-converting wheel 100 may further include a fixing ring 160 sleeved on the rotating shaft 111, so that the inner ring portion 121 of the turntable 120 is fixed between the fixing ring 160 and the motor 110.

Figure 3:
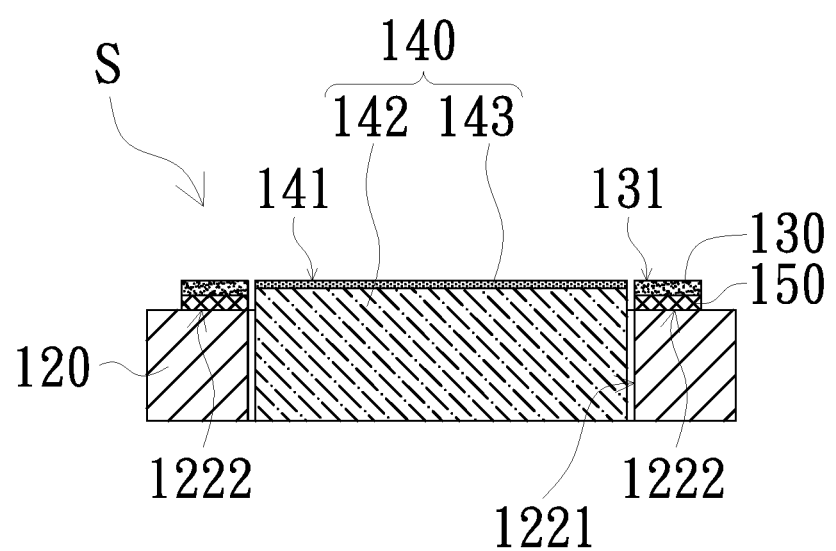
FIG. 3 is a schematic sectional view taken along the line A-A in FIG. 1.

FIG. 3 is a schematic sectional view taken along the line A-A in FIG. 1. Referring to FIG. 3, the light receiving surface 131 and the reflective surface 141 facing the light incident side S in the embodiment are, for example, coplanar, or the light receiving surface 131 is farther from the light incident side S with respect to the reflective surface 141, and the distance (height difference) between the reflective surface 141 and light receiving surface 131 is between 0 mm and 1 mm. In other words, the light receiving surface 131 and the reflective surface 141 in FIG. 3 may be coplanar, or the light receiving surface 131 may be lower than the reflective surface 141.

In the embodiment, the light-reflecting region 1221 is, for example, an opening disposed on the annular irradiation portion 122 of the turntable 120. The reflective element 140 includes a glass substrate 142 and a reflective film 143. The glass substrate 142 of the reflective element 140 is embedded in the opening (the light-reflecting region 1221), and the reflective film 143 is disposed on the glass substrate 142, so that the reflective film 143 may have better flatness. The material of the reflective film 143 includes, for example, a material having a reflective function such as metal, but the invention is not limited thereto. The reflective surface 141 is the surface of the reflective film 143. In addition, the thickness of the glass substrate 142 is, for example, greater than the thickness of the turntable 120. The surfaces of the inner ring portion 121 and the annular irradiation portion 122 of the turntable 120 facing the light incident side S are, for example, coplanar.

The wavelength-converting wheel 100 may further include a reflective adhesive layer 150 disposed between the wavelength-converting region 1222 of the turntable 120 and the wavelength-converting layer 130 to increase the reflectivity and the adhesion of the wavelength-converting layer 130. The reflective adhesive layer 150 may be at least one of a silver reflective film and a $TiO_2$ reflective adhesive film, but the invention is not limited thereto. In the embodiment, the thickness of the reflective adhesive layer 150 may be, for example, 0.05 mm to 0.2 mm, and the thickness of the wavelength-converting layer 130 may be, for example, 0.1 mm to 0.3 mm, so that the distance (height difference) between the reflective surface 141 of the reflective film 143 and the light receiving surface 131 of the wavelength-converting layer 130 can be designed to be between 0 mm and 1 mm.

In the wavelength-converting wheel 100 of the embodiment, the light receiving surface 131 of the wavelength-converting layer 130 facing the light incident side S is coplanar with the reflective surface 141 of the reflective element 140 facing the light incident side S, as such, in the design of optical systems, the incident exciting beam can be relatively accurately focused on the light receiving surface 131 and the reflective surface 141, so that the wavelength conversion efficiency of the wavelength-converting wheel 100 can be improved and the reflection efficiency of the reflective element 140 can be also taken into consideration. In addition, the wavelength conversion efficiency of the wavelength-converting wheel 100 is not affected if the light receiving surface 131 is farther away from the light incident side S with respect to the reflective surface 141.

Figure 4:
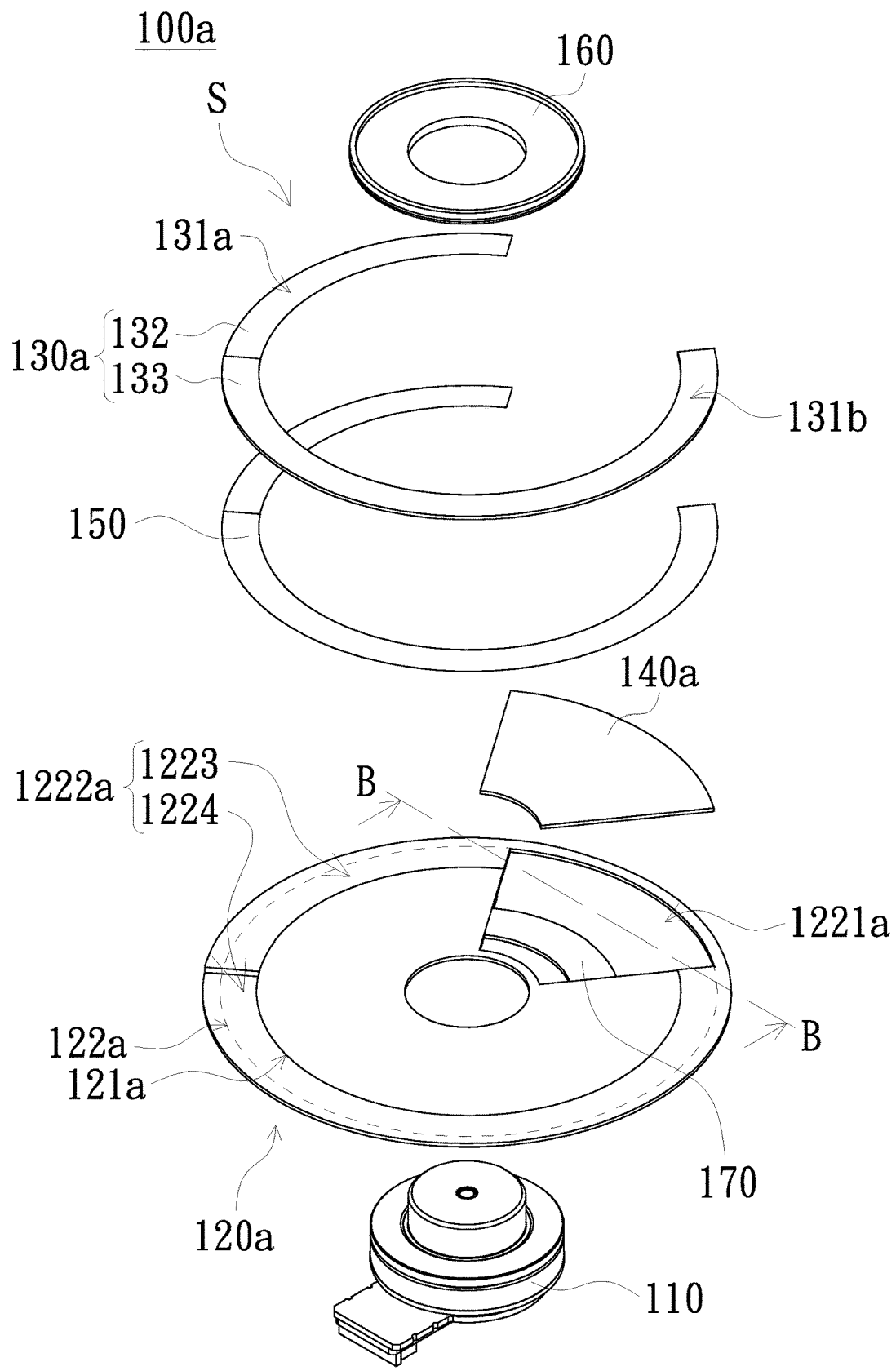
FIG. 4 is an exploded view of a wavelength-converting wheel according to another embodiment of the invention.
Figure 5:
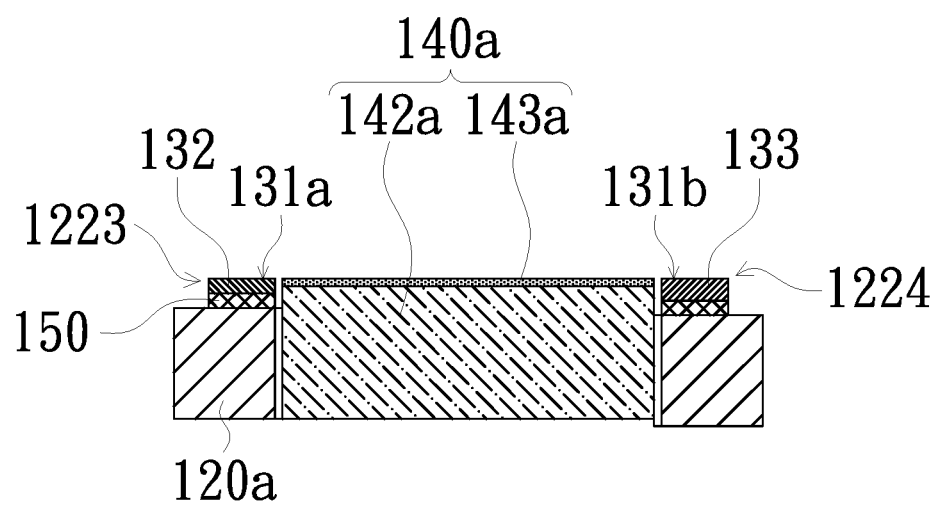
FIG. 5 is an overall schematic sectional view of the wavelength-converting wheel taken along the line B-B in FIG. 4.

FIG. 4 is an exploded view of a wavelength-converting wheel according to another embodiment of the invention. FIG. 5 is an overall schematic sectional view of the wavelength-converting wheel taken along the line B-B in FIG. 4. Referring to FIGS. 4 and 5, the structure and advantages of the wavelength-converting wheel 100a of the embodiment are similar to those of the above-mentioned wavelength-converting wheel 100, and therefore only the major differences in structure will be described below. In the wavelength-converting wheel 100a of the embodiment, the light-reflecting region 1221a is, for example, a sector opening disposed on the turntable 120a and extends to the inner ring portion 121a. The reflective element 140a is, for example, a sector reflective element corresponding to the sector opening (the light-reflecting region 1221a). The reflective element 140a includes, for example, a glass substrate 142a and a reflective film 143a. The glass substrate 142a of the reflective element 140a is embedded in the sector opening (the light-reflecting region 1221a), and the reflective film 143a is disposed on part or all of the glass substrate 142a, so that the reflective film 143a may have better flatness.

The portion of the reflective element 140a located in the inner ring portion 121a is fixed between the fixed ring 160 and the motor 110. The wavelength-converting wheel 100a of the embodiment may further include a strip-shaped supporting element 170 disposed on the opposite side of the turntable 120a from the light incident side S. The strip-shaped supporting element 170 crosses the sector opening (the light-reflecting region 1221a) to support the reflective element 140a. In other embodiments, an adhesive layer may be disposed between the strip-shaped supporting element 170 and the reflective element 140a, so that the reflective element 140a is more stably supported by the strip-shaped support element 170. In addition, the fixing ring 160 covers part of the reflective element 140a to fix the reflective element 140a.

In the wavelength-converting wheel 100a of the embodiment, the reflective element 140a and the strip-shaped supporting element 170 are disposed in the sector opening (the light-reflecting region 1221a), as such, the overall weight distribution of the turntable 120a can be adjusted, so that the turntable 120a can have improved dynamic balance when rotating.

The turntable 120a is a metal turntable, and the material thereof is aluminum for example, but the invention is not limited thereto. The annular irradiation portion 122a is formed by pressing the outer edge of the turntable 120a, the annular irradiation portion 122a is a concave portion that is recessed with respect to the inner ring portion 121a in a direction away from the light incident side S, and the wavelength-converting layer 130a is disposed in the concave portion. In addition, the surface of the inner ring portion 121a facing the light incident side S and the reflective surface (not labeled) of the reflective film 143a are, for example, coplanar, and the reflective element 140a protrudes from the sector opening 1221a.

The wavelength conversion efficiency of the wavelength-converting layer 130a is also related to the thickness, and the required preferred thickness of the wavelength-converting layer for different colors and materials is not necessarily the same, and therefore, the wavelength-converting region 1222a of the embodiment may have a plurality of concave blocks. In FIG. 4, two concave blocks 1223 and 1224 are taken as examples, but the invention is not limited thereto. The concave blocks 1223 and 1224 are respectively recessed at different distances away from the light incident side S (that is, the depths of recess are different). The wavelength-converting layer 130a includes a plurality of wavelength-converting blocks that can be excited to emit beams of different colors. In FIG. 4, two wavelength-converting blocks 132 and 133 are taken as an example, and the wavelength-converting blocks 132 and 133 are disposed in the concave blocks 1223 and 1224, respectively. Due to the different depths of recess of the concave blocks 1223 and 1224, the light receiving surfaces 131a and 131b of the wavelength-converting blocks 132 and 133 can be coplanar, although the thicknesses of the wavelength-converting blocks 132 and 133 are different.

The wavelength-converting block 132 is, for example, a green wavelength-converting block that can be excited to emit green light, the wavelength-converting block 133 is, for example, a yellow wavelength-converting block that can be excited to emit yellow light, but the color of the wavelength-converting layer 130a is not limited thereto. It should be noted that the wavelength-converting region 1222a in the embodiment may also be replaced with a concave portion having a single recess depth, and the wavelength-converting layer 130a may also be replaced with a wavelength-converting layer having only one color.

Figure 6:
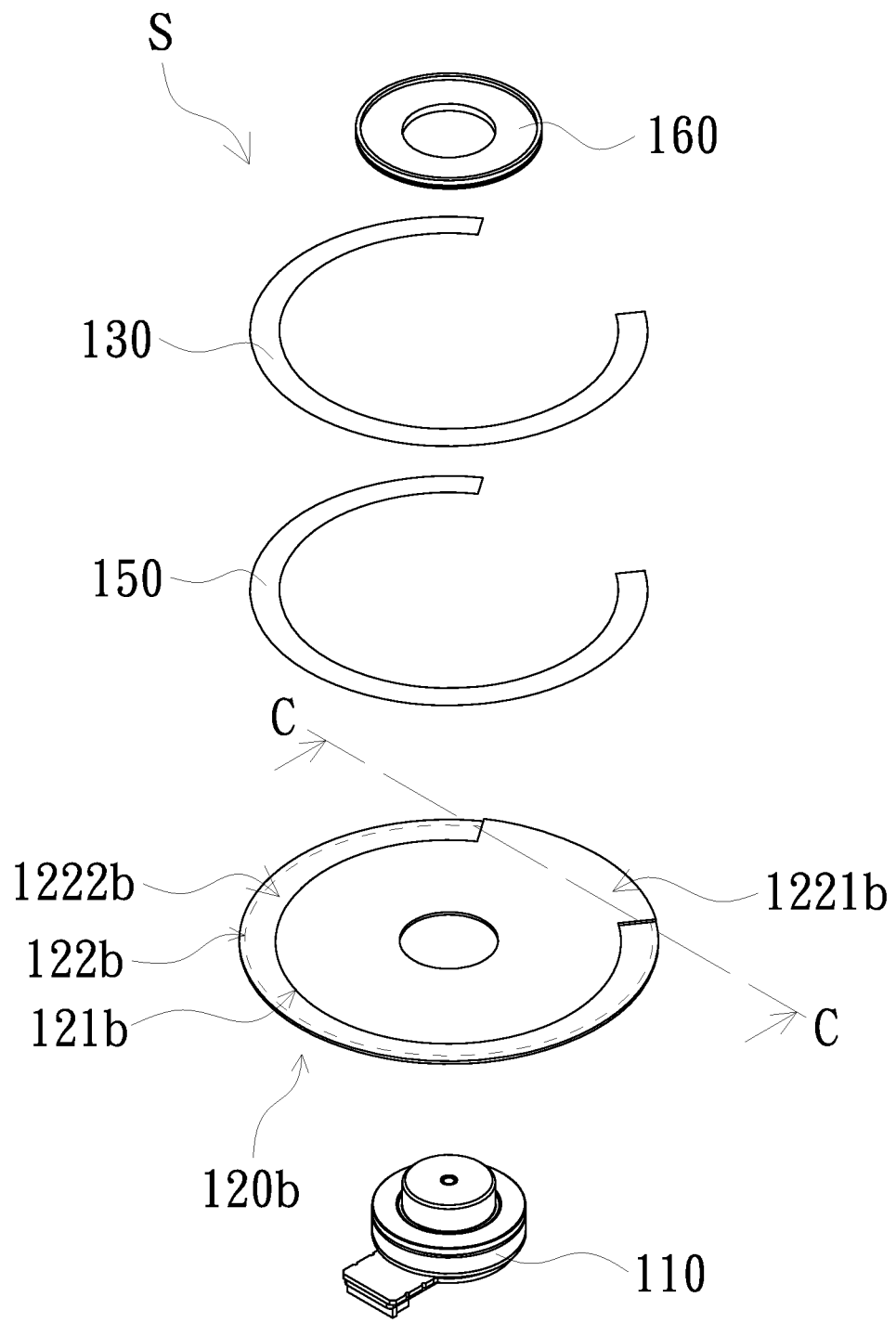
FIG. 6 is an exploded view of a wavelength-converting wheel according to another embodiment of the invention.
Figure 7:
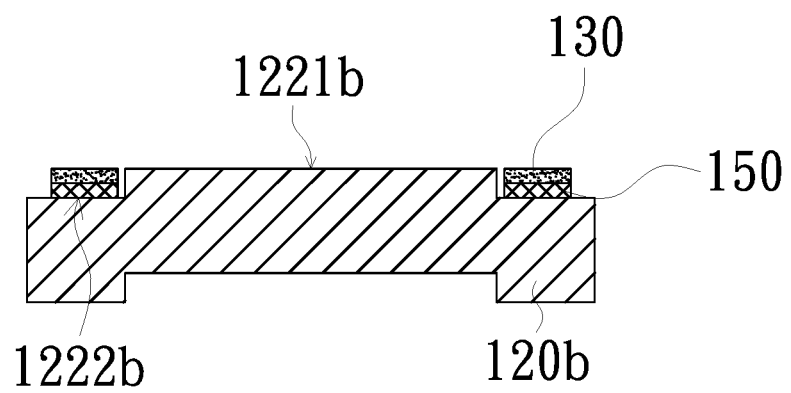
FIG. 7 is an overall schematic sectional view of the wavelength-converting wheel taken along the line C-C in FIG. 6.

FIG. 6 is an exploded view of a wavelength-converting wheel according to another embodiment of the invention. FIG. 7 is an overall schematic sectional view of the wavelength-converting wheel taken along the line C-C in FIG. 6. Referring to FIGS. 6 and 7, the structure and advantages of the wavelength-converting wheel 100b of the embodiment are similar to those of the above-mentioned wavelength-converting wheel 100, and therefore only the major differences in structure will be described below. In the wavelength-converting wheel 100b of the embodiment, the turntable 120b is a metal turntable, and the material is aluminum for example, but the invention is not limited thereto. The wavelength-converting region 1222b of the annular irradiation portion 122b is formed by pressing the outer edge of the turntable 120b, the wavelength-converting region 1222b is a concave portion that is recessed with respect to the inner ring portion 121b in a direction away from the light incident side S and is also recessed with respect to the light-reflecting region 1221b in a direction away from the light incident side S, so that the light receiving surface of the wavelength-converting layer 130 of the wavelength-converting region 1222b is coplanar with the reflective surface of the light-reflecting region 1221b, or the light receiving surface of the wavelength-converting layer 130 of the wavelength-converting region 1222b is farther from the light incident side S with respect to the reflective surface of the light-reflecting region 1221b. The light-reflecting region 1221b and the inner ring portion 121b are, for example, coplanar. In the embodiment, the light-reflecting region 1221b is a part of a metal turntable and may optionally be disposed with a reflective film (not shown).

Figure 8:
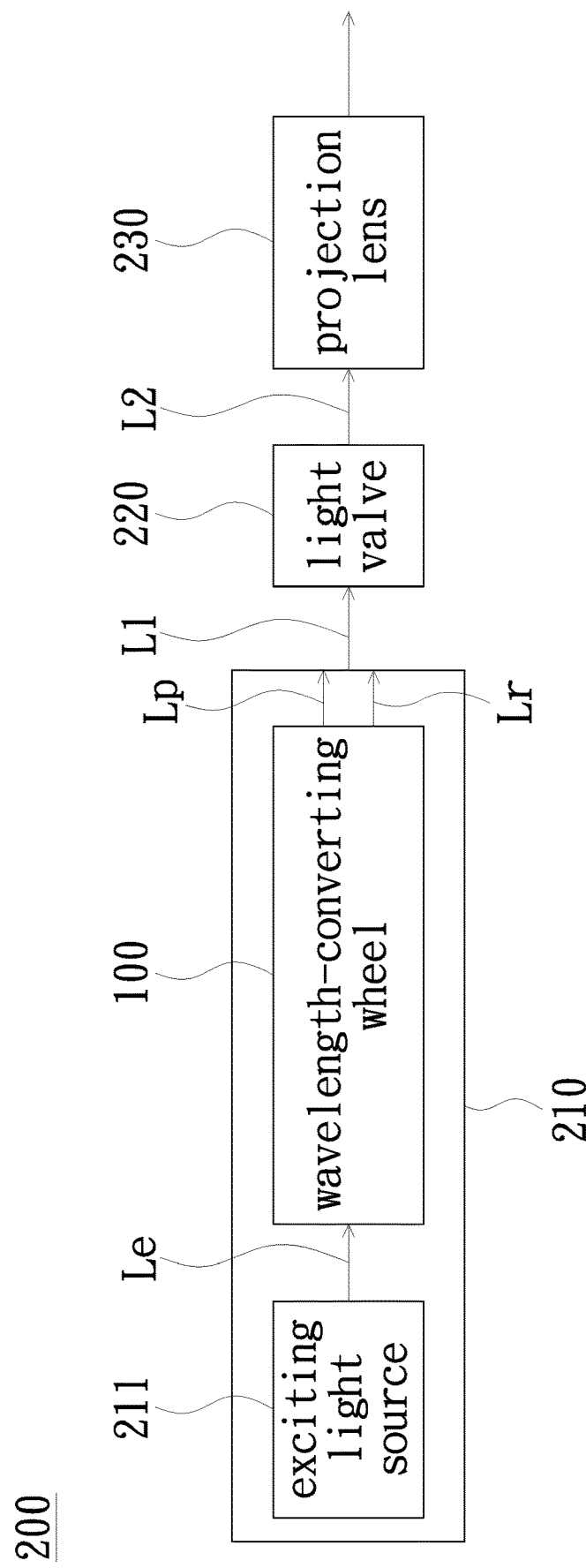
FIG. 8 is a schematic block diagram of a projection apparatus according to an embodiment of the invention.

FIG. 8 is a schematic block diagram of a projection apparatus according to an embodiment of the invention. Referring to FIG. 8, the projection apparatus 200 of the embodiment includes an illumination system 210, a light valve 220 and a projection lens 230. The illumination system 210 is used to provide an illumination beam L1. The light valve 220 is disposed on the transmission path of the illumination beam L1 to convert the illumination beam L1 into the image beam L2. The projection lens 230 is disposed on the transmission path of the image beam L2 to project the image light beam L2 onto the screen to form an image on the screen. The light valve 220 may be a transmissive light valve or a reflective light valve, wherein the transmissive light valve may be a transmissive liquid crystal panel, and the reflective light valve may be a digital micro-mirror device (DMD) or a liquid crystal on silicon (LCOS) panel, but the invention is not limited thereto. The projection lens 230 includes, for example, a combination of one or more optical lenses having dioptric power, such as various combinations of non-planar lenses including biconcave lenses, biconvex lenses, meniscus lenses, meniscus lenses, plano-convex lenses, and plano-concave lenses. In an embodiment, the projection lens 230 may also include a planar optical lens. The invention does not limit the configuration and type of the projection lens 230.

Referring to FIGS. 1 and 8, the illumination system 210 includes an exciting light source 211 and a wavelength-converting wheel 100. The exciting light source 211 is, for example, a diode module or a diode module bank array including a light emitting diode or a laser diode (LD) and for providing the exciting beam Le, but the invention is not limited thereto. The wavelength-converting wheel 100 is disposed on the transmission path of the exciting beam Le. Although FIG. 8 illustrates the wavelength-converting wheel 100 of FIG. 1 as an example, the wavelength-converting wheel 100 may be replaced with the wavelength-converting wheel of any of the above embodiments.

The exciting beam Le is used to irradiate the annular irradiation portion 122 of the wavelength-converting wheel 100. The wavelength-converting layer 130 on the annular irradiation portion 122 is used to convert the exciting beam Le into a converted beam Lp as the wavelength-converting wheel 100 rotates around the rotating shaft 111. The converted beam Lp is then reflected by the reflective adhesive layer 150 and/or the annular irradiation portion 122 of the metal turntable 120. The wavelength of the converted beam Lp is different from the wavelength of the exciting beam Le. The reflective element 140 is used to reflect the exciting beam Le (in FIG. 8, Lr denotes the exciting beam reflected by the reflective element 140). The illumination beam L1 includes the converted beam Lp and the exciting beam Lr reflected by the reflective element 140. The illumination system 210 may further include other optical elements to transmit the illumination beam L1 to the light valve 220. The specific implementation of the illumination system 210 will be further described below with reference to the drawings. However, the specific architecture of the illumination system of the invention is not limited to the embodiments below.

Figure 9:
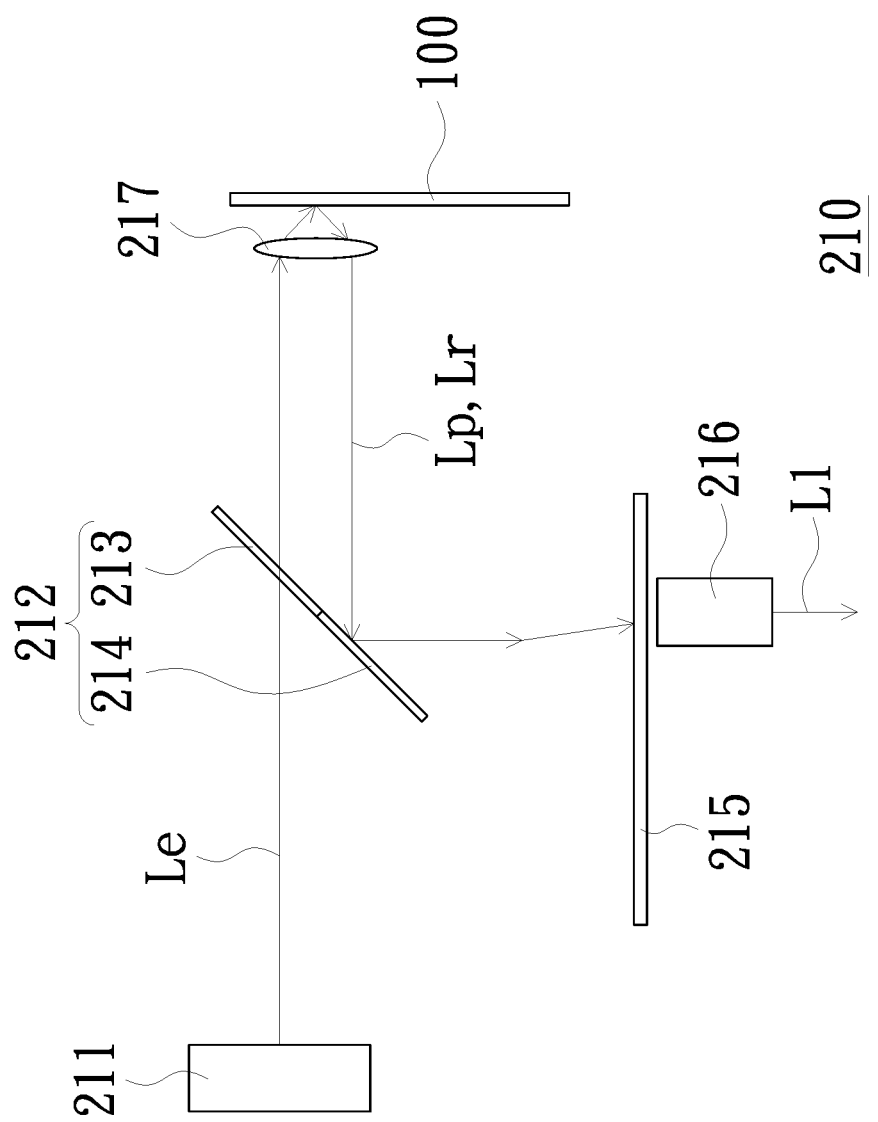
FIG. 9 is a schematic view of an illumination system of a projection apparatus according to an embodiment of the invention.

FIG. 9 is a schematic view of an illumination system of a projection apparatus according to an embodiment of the invention. Referring to FIGS. 8 and 9, in addition to the exciting light source 211 and the wavelength-converting wheel 100 described above, the illumination system 210 of the embodiment may further include a light combining element 212, a filter wheel 215, a light homogenizing element 216 and a condenser lens 217, wherein the light homogenizing element 216 can be a light integrating rod, but the invention is not limited thereto.

The light combining element 212 is disposed between the exciting light source 211 and the wavelength-converting wheel 100 and includes a dichroic portion 213 and a reflective portion 214. The dichroic portion 213 is adjacent to the reflective portion 214, and the dichroic portion 213 is used to allow the exciting beams Le and Lr to pass therethrough and reflect the converted beam Lp. The reflective portion 214 can reflect the exciting beams Le, Lr and the converted beam Lp. The condenser lens 217 is disposed between the light combining element 212 and the wavelength-converting wheel 100, and is used to converge the exciting beam Le on the wavelength-converting wheel 100 and collect the converted beam Lp and the exciting beam Lr reflected by the wavelength-converting wheel 100. The wavelength-converting wheel 100 of the invention is designed to have a structure in which the light receiving surface 131 of the wavelength-converting layer 130 facing the light incident side S is coplanar with the reflective surface 141 of the reflective element 140 facing the light incident side S or the light receiving surface 131 is farther from the light incident side S with respect to the reflective surface 141, so that the reflected converted beam Lp and the exciting beam Lr can be more efficiently collected by the condenser lens 217 and transmitted to the light combining element 212. The exciting beam Le provided by the exciting light source 211 passes through the dichroic portion 213 of the light combining element 212 and is transmitted to the wavelength-converting wheel 100, and the converted beam Lp and the exciting beam Lr reflected from the wavelength-converting wheel 100 are transmitted to the light combining element 212. The exciting beam Lr is reflected by the reflective portion 214 of the light combining element 212 and sequentially passes through the filter wheel 215 and the light homogenizing element 216, and the converted beam Lp is reflected by the reflective portion 214 and the dichroic portion 213 of the light combining element 212 and sequentially passes through the filter wheel 215 and the light homogenizing element 216. Therefore, the illumination beam L1 provided by the illumination system 210 includes the converted beam Lp and the exciting beam Lr.

In summary, in the projection apparatus and the wavelength-converting wheel of the embodiment of the invention, the light receiving surface of the wavelength-converting layer facing the light incident side is coplanar with the reflective surface of the reflective element facing the light incident side or the light receiving surface is farther from the light incident side with respect to the reflective surface. As such, the incident exciting beam can be accurately focused on the light receiving surface and the reflective surface simultaneously, so that the wavelength conversion efficiency of the wavelength-converting wheel can be improved and the reflection efficiency of the reflective element can be also taken into consideration.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A wavelength-converting wheel having a light incident side, and the wavelength-converting wheel comprising:
    a motor, having a rotating shaft;
    a turntable, having an inner ring portion and an annular irradiation portion, wherein the inner ring portion is sleeved on the rotating shaft, the annular irradiation portion is connected to an outer edge of the inner ring portion, and the annular irradiation portion comprises a light-reflecting region and a wavelength-converting region;
    a wavelength-converting layer, disposed in the wavelength-converting region and having a light receiving surface facing the light incident side; and
    a reflective element, disposed in the light-reflecting region and having a reflective surface facing the light incident side, wherein the light receiving surface is coplanar with the reflective surface or the light receiving surface is farther from the light incident side with respect to the reflective surface,
    wherein a distance between the reflective surface and the light receiving surface is between 0 mm and 1 mm.

2. The wavelength-converting wheel according to claim 1, wherein the turntable is a metal turntable, the wavelength-converting region of the annular irradiation portion is formed by pressing the turntable, the wavelength-converting region is a concave portion that is recessed with respect to the inner ring portion in a direction away from the light incident side, and the light-reflecting region is coplanar with the inner ring portion.

3. The wavelength-converting wheel according to claim 1, further comprising a fixing ring sleeved on the rotating shaft and fixed to the inner ring portion.

4. A wavelength-converting wheel having a light incident side, and the wavelength-converting wheel comprising:
    a motor, having a rotating shaft;
    a turntable, having an inner ring portion and an annular irradiation portion, wherein the inner ring portion is sleeved on the rotating shaft, the annular irradiation portion is connected to an outer edge of the inner ring portion, and the annular irradiation portion comprises a light-reflecting region and a wavelength-converting region;
    a wavelength-converting layer, disposed in the wavelength-converting region and having a light receiving surface facing the light incident side; and
    a reflective element, disposed in the light-reflecting region and having a reflective surface facing the light incident side, wherein the light receiving surface is coplanar with the reflective surface or the light receiving surface is farther from the light incident side with respect to the reflective surface,
    wherein the light-reflecting region is an opening, the reflective element is embedded in the opening, the reflective element comprises a glass substrate and a reflective film, and the reflective film is disposed on the glass substrate.

5. The wavelength-converting wheel according to claim 4, wherein the inner ring portion and the reflective film are coplanar, and the reflective element protrudes from the opening.

6. The wavelength-converting wheel according to claim 4, wherein the turntable is a metal turntable, the annular irradiation portion is formed by pressing the turntable, and the annular irradiation portion is a concave portion that is recessed with respect to the inner ring portion in a direction away from the light incident side.

7. The wavelength-converting wheel according to claim 6, wherein the wavelength-converting region has a plurality of concave blocks, the plurality of concave blocks are respectively recessed at different distances away from the light incident side, the wavelength-converting layer comprises a plurality of wavelength-converting blocks of different colors and respectively disposed in the plurality of concave blocks, the plurality of wavelength-converting blocks have different thicknesses, and the light receiving surfaces of the plurality of wavelength-converting blocks are coplanar.

8. The wavelength-converting wheel according to claim 4, wherein the opening is a sector opening and extends to the inner ring portion, and the reflective element is a sector reflective element corresponding to the sector opening.

9. A wavelength-converting wheel having a light incident side, and the wavelength-converting wheel comprising:
    a motor, having a rotating shaft;
    a turntable, having an inner ring portion and an annular irradiation portion, wherein the inner ring portion is sleeved on the rotating shaft, the annular irradiation portion is connected to an outer edge of the inner ring portion, and the annular irradiation portion comprises a light-reflecting region and a wavelength-converting region;

a wavelength-converting layer, disposed in the wavelength-converting region and having a light receiving surface facing the light incident side; and a reflective element, disposed in the light-reflecting region and having a reflective surface facing the light incident side, wherein the light receiving surface is coplanar with the reflective surface or the light receiving surface is farther from the light incident side with respect to the reflective surface, wherein the wavelength-converting wheel further comprising a reflective adhesive layer disposed between the wavelength-converting region and the wavelength-converting layer.

10. A projection apparatus comprising an illumination system, a light valve and a projection lens, the illumination system being adapted to provide an illumination beam, the light valve being disposed on a transmission path of the illumination beam to convert the illumination beam into an image beam, the projection lens being disposed on a transmission path of the image beam, and the illumination system comprising:

an exciting light source, adapted to provide an exciting beam; and a wavelength-converting wheel, having a light incident side, and the wavelength-converting wheel comprising:
a motor, having a rotating shaft;
a turntable, having an inner ring portion and an annular irradiation portion, wherein the inner ring portion is sleeved on the rotating shaft, the annular irradiation portion is connected to an outer edge of the inner ring portion, and the annular irradiation portion comprises a light-reflecting region and a wavelength-converting region;
a wavelength-converting layer, disposed in the wavelength-converting region and having a light receiving surface facing the light incident side; and
a reflective element, disposed in the light-reflecting region and having a reflective surface facing the light incident side, wherein the light receiving surface is coplanar with the reflective surface or the light receiving surface is farther from the light incident side with respect to the reflective surface, wherein the wavelength-converting wheel is disposed on a transmission path of the exciting beam, the wavelength-converting layer of the wavelength-converting wheel is adapted to convert the exciting beam into a converted beam, the reflective element of the wavelength-converting wheel is adapted to reflect the exciting beam, and the illumination beam comprises the converted beam and the exciting beam reflected by the reflective element, wherein a distance between the reflective surface and the light receiving surface is between 0 mm and 1 mm.

11. The projection apparatus according to claim 10, wherein the light-reflecting region is an opening, the reflective element is embedded in the opening, the reflective element comprises a glass substrate and a reflective film, and the reflective film is disposed on the glass substrate.

12. The projection apparatus according to claim 11, wherein the inner ring portion and the reflective film are coplanar, and the reflective element protrudes from the opening.

13. The projection apparatus according to claim 11, wherein the turntable is a metal turntable, the annular irradiation portion is formed by pressing the turntable, and the annular irradiation portion is a concave portion that is recessed with respect to the inner ring portion in a direction away from the light incident side.

14. The projection apparatus according to claim 13, wherein the wavelength-converting region has a plurality of concave blocks, the plurality of concave blocks are respectively recessed at different distances away from the light incident side, the wavelength-converting layer comprises a plurality of wavelength-converting blocks of different colors and respectively disposed in the plurality of concave blocks, the plurality of wavelength-converting blocks have different thicknesses, and the light receiving surfaces of the plurality of wavelength-converting blocks are coplanar.

15. The projection apparatus according to claim 11, wherein the opening is a sector opening and extends to the inner ring portion, and the reflective element is a sector reflective element corresponding to the sector opening.

16. The projection apparatus according to claim 10, wherein the turntable is a metal turntable, the wavelength-converting region of the annular irradiation portion is formed by pressing the turntable, the wavelength-converting region is a concave portion that is recessed with respect to the inner ring portion in a direction away from the light incident side, and the light-reflecting region is coplanar with the inner ring portion.

17. The projection apparatus according to claim 10, further comprising a reflective adhesive layer disposed between the wavelength-converting region and the wavelength-converting layer.

18. The projection apparatus according to claim 10, further comprising a fixing ring sleeved on the rotating shaft and fixed to the inner ring portion.

* * * * *